United States Patent [19]
Machida et al.

[11] Patent Number: 6,049,432
[45] Date of Patent: Apr. 11, 2000

[54] ZOOM LENS BARREL

[75] Inventors: Kiyosada Machida, Urawa; Hidenori Miyamoto, Urayasu; Hiroshi Wakabayashi, Yokohama; Tomoki Nishimura, Kawasaki, all of Japan

[73] Assignee: Nikon Corporation, Tokyo, Japan

[21] Appl. No.: 09/286,449

[22] Filed: Apr. 6, 1999

Related U.S. Application Data

[63] Continuation of application No. 08/982,422, Dec. 2, 1997, abandoned, which is a continuation of application No. 08/378,016, Jan. 25, 1995, abandoned, which is a continuation-in-part of application No. 08/253,312, Jun. 3, 1994, abandoned.

[30] Foreign Application Priority Data

Jun. 7, 1993 [JP] Japan ..................... 5-160036
Feb. 4, 1994 [JP] Japan ..................... 6-012735
Feb. 4, 1994 [JP] Japan ..................... 6-012986

[51] Int. Cl.[7] .................................. G02B 15/14
[52] U.S. Cl. .................. 359/700; 359/699; 359/826; 396/83; 396/349
[58] Field of Search ................ 359/819, 823, 359/826, 699, 700, 701, 706; 396/83, 72, 349, 85

[56] References Cited

U.S. PATENT DOCUMENTS

| 3,715,929 | 2/1973 | Konigslehne et al. | 359/700 |
| 4,114,984 | 9/1978 | Muryoi | 359/706 |
| 4,779,964 | 10/1988 | Ozawa et al. | 359/700 |
| 5,014,077 | 5/1991 | Yomogizawa et al. | 396/349 |
| 5,243,467 | 9/1993 | Tanaka | 359/826 |
| 5,313,329 | 5/1994 | Ueda | 359/700 |
| 5,687,029 | 11/1997 | Omi et al. | 359/700 |
| 5,701,523 | 12/1997 | Omiya et al. | 396/83 |

FOREIGN PATENT DOCUMENTS 4-278932 of 1992 Japan.

*Primary Examiner*—Loha Ben

[57] ABSTRACT

A zoom lens barrel includes at least two lens groups, a linear movement guide tube for guiding a linear movement of the lens groups along the optical axis and a cam tube for reciprocating the lens groups along the optical axis. The guide tube has a guiding portion formed on a film side end portion of the guide tube and extends in parallel with a film surface.

13 Claims, 11 Drawing Sheets

ZOOM LENS BARREL

This application is a Continuation of application Ser. No. 08/982,422, filed Dec. 2, 1997, now abandoned, which in turn is a continuation of application 08/378,016 filed Jan. 25, 1995, now abandoned, which in turn was a continuation-in-part of application Ser. No. 08/253,312 filed Jun. 3, 1994, now abandoned.

BACKGROUND OF THE INVENTION

1. Field of the Invention

The present invention relates to a zoom lens barrel provided with a zoom type photographic lens (hereinafter referred to as a zoom lens) which facilitates telephotographing and wide angle photographing by making adjustable a distance between a plurality of lens groups.

2. Related Background Art

The recent compact camera which has multi-functions uses a zoom lens which can freely photograph within a range from a telephotographic position to a wide angle position. Further, a camera of a barrel sinking type in which the zoom lens is moved in the camera body is generally used in order to satisfy the requirements in that the camera be made small and thin.

The zoom lens of this type has a structure that at least two set of lens groups are reciprocatingly arranged in the lens barrel so that the composite focal length is varied by changing the distance between the lens groups to photograph at any image magnification.

The conventional zoom lens barrel having a zoom lens of this type as disclosed in Japanese Patent Application Laid-Open No. 4-278932 comprises a linear movement guide tube provided at the side of the camera body and provided with a plurality of axially extending guide grooves formed in the outer peripheral surface of the guide tube, a plurality of lens groups held by the respective lens holders having engaging pins inserted in the guide grooves and which reciprocate along the optical axis, and a zoom cam ring rotatably mounted on the outer peripheral surface of the linear movement guide tube and provided in the outer peripheral surface with a plurality of cam grooves which incline with respect to the optical axis and in which the engaging pins of the corresponding lens holders are respectively inserted through the guide grooves.

In order to achieve quick photographing and improve operability of the compact camera provided with such a zoom lens barrel, the zoom lens makes zooming operation in such a manner that the zoom cam ring is rotated by a driving motor assembled in the camera body to reciprocate the lens groups together with the lens holders, whereby the distance between the lens groups is changed and the composite focal length is varied.

FIG. 15 is a developed view of the zoom lens cam ring, showing the shapes of guide grooves and cam grooves of the zoom lens barrel and the relationship therebetween. A zoom cam ring 1 having a circumferential length A is used for reciprocating two lens groups, and has a plurality of sets of cam grooves (such as three first cam grooves 2 and three second cam grooves 3) formed on the peripheral surface and alternately arranged in a circumferential direction.

The first cam groove 2 is for reciprocating a respective first lens group disposed closer to an object along a respective one of first guide grooves 4 of a linear movement guide tube and forms an inclined zooming groove intersecting with the optical axis at a predetermined angle. Each engaging pin 5 provided on a lens holder for holding the first lens group engages both the respective cam groove 2 and the respective guide groove 4. Each second cam groove 3 is for reciprocating the second lens group disposed remote from the object along the respective one of second guide grooves 6 of the linear movement guide tube.

Each second cam groove 3 is bent into a shallow V shape so that it comprises a barrel sinking groove portion 3a disposed in parallel with a film surface extending circumferentially of the zoom cam ring 1 and a zooming groove 3b intersecting with the optical axis at a predetermined angle.

Each engaging pin 7 provided on the lens holder for holding the second lens group engages the respective second cam groove 3 through the respective guide groove 6. The barrel sinking groove portion 3a of each second cam groove 3 is formed at the side of the wide end of the zoom cam ring 1.

The end a of the barrel sinking groove portion 3a which is remote from the zooming groove 3b is disposed at the end of the first cam groove 2 which is at the side of the sinking barrel, i.e., at the vicinity of the end a of the first cam groove 2 which is remote from the object. This makes the distance between the two lens groups as small as possible when the zoom lens barrel is sunk in the camera body at the non-photographing time, whereby the camera is made thin and small.

The angle of inclination $\alpha$ (the angle between the zooming groove 3b and the film surface) of each zooming groove 3b is set to be larger than the angle of inclination $\beta$ of the first cam groove 2. The first guide grooves 4 and the second guide grooves 6 are formed close to each other in the periphery of the linear movement guide tube and in parallel with the optical axis so that they restrict rotation of the lens groups and define moving strokes of the lens groups.

At the non-photographing time when the lens groups are sunk in the camera body, the engaging pins 5 and 7 are disposed at the ends of the first and second cam grooves 2 and 3 which are remote from the object, i.e., at the barrel sinking end positions a, as shown in FIG. 15. When the zoom cam ring 1 is rotated from this state in the direction shown by an arrow 8, the engaging pins 5 and 7 are moved to wide angle side ends (wide angle positions) b to increase the distance between the two lens groups. As the engaging pins 5 and 7 are moved from the wide angle ends b to the telephotographic ends (telephotographic positions) c, the distance between the lens groups becomes small again.

The arrow 9 shows the direction toward the object, i.e., the zoom lens extending direction.

Hitherto, the cam ring is engaged with, for example, an outer barrel provided outside by a helicoid connection or the like. In this case, in order to remove a play between the rotating barrel and the outer barrel which is generated by the helicoid connection or the like, an urging member such as a compression coil spring or the like is provided between the rotating barrel and the outer barrel so as to urge the rotating barrel to a predetermined direction so that the rotating barrel and the outer barrel is in contact with pressure in part.

The urging member such as the compression coil spring is generally made of stainless steel or the like having a high elasticity. Since such ductile material is difficult to be machined, a sheared section of such material has a large plastic deformation so that points, flash or the like is easily generated on the sheared section.

On the other hand, since the vicinity of the sheared section of the compression coil spring serves as a contacting surface to the rotating barrel or the outer barrel, if the sheared section has points or the like, those pointed portions can stick into the rotating barrel or the outer barrel in some cases. As a result, the rotating barrel can not rotate smoothly.

In a compact camera provided with a zoom lens barrel as described above, it is desirable that the distance between two lens groups be made as small as possible, and more specifically it is preferred that the distance be substantially zero in the barrel sinking state at the non-photographing time in order to make thin and miniaturize the camera. For structural reasons, however, it is difficult to make the difference between the lens groups zero in most cases. One reason is because the length of the sinking barrel 3a formed with each second cam groove 3 has a substantive length. Even if the strokes and the rotational angles of the first and second cam grooves are equal to each other, the length of the barrel sinking groove portion 3a of each second cam groove 3, as shown in FIG. 16 is larger than the one as shown in FIG. 15, when the lens system has a large sinking length from the wide angle end position b or when the stroke from the wide angle end position b to the sinking position increases to make the camera body thin and the camera compact. This causes the barrel sinking side end a of each first cam groove 2 to interfere with the wide angle side end b of the corresponding barrel sinking groove portion 3a and thus makes it difficult to extend and retract the lens groups.

If the diameter of the lens barrel is reduced to make the camera compact, the circumferential length B of the zoom cam ring 1' becomes naturally shorter, as shown in FIG. 17, than the circumferential length A of the zoom cam ring 1 as shown in FIG. 15. When the shapes and the sizes of the first and second cam grooves 2 and 3 shown in FIG. 17 are the same as those shown in FIG. 15, the rotational angle of the zoom cam ring 1' becomes large. Further, the pitches of the first and second cam grooves 2 and 3 become small, and thus their barrel sinking side ends a interfere with each other.

When the angle of inclination β between the first cam grooves 2 and the film surface is set large in order to solve these problems, the rotational angle of the zoom cam ring 1' for the whole stroke can be made small and the first and second cam grooves 2 and 3 can be prevented from interfering with each other. In this case, however, a large angle of inclination β increases the rotational load for rotating the zoom cam ring 1'. Thus, a large driving motor providing a large driving power is required, hindering compactness of the camera. This contradicts the reduction of the lens diameter to make the camera compact.

SUMMARY OF THE INVENTION

The present invention was made under these circumstances and one of the objects thereof is to provide a zoom lens barrel which has a simple and compact structure, can prevent interference between cam grooves by shortening or without use of the barrel sinking groove portion of each cam grooves, and can reduce a driving load.

In order to achieve the above objects, a zoom lens barrel in which a composite focal length is varied by changing the distance between a plurality of lens groups upon reciprocating the lens groups along the optical axis, the zoom lens barrel comprises a linear movement guide tube having a plurality of guide grooves arranged parallel with the optical axis, having inserted therein engaging pins provided on lens holders for holding the respective lens groups and reciprocating the lens groups along the guide grooves, a zoom cam ring for reciprocating the lens groups, the zoom cam ring being rotatably and slidably mounted on the linear movement guide tube and having a plurality of cam grooves for receiving the engaging pins of the lens holders for holding the lens groups, and parallel grooves extending from the film side end of the guide grooves of the linear movement guide tube for guiding at least one of the lens groups in parallel with a film surface and each having a forward end overlapping the film side end of the cam groove corresponding to each of the guide grooves at the barrel sinking time.

In the present invention, the parallel grooves extending from the guide grooves substantially form barrel sinking groove portions. Thus, the amount of the barrel sinking of the cam grooves can be shortened and interference between adjacent cam grooves is prevented.

Since the parallel grooves of the zoom lens barrel of the present invention extend from the film side end of the guide grooves of the linear movement guide tube for guiding at least one of the lens groups in parallel with a film surface and each parallel groove has a forward end overlapping the film side end of the cam groove corresponding to each of the guide groove at the barrel sinking time, the barrel sinking groove portions can be shortened. Even if, therefore, the stroke between the wide angle end position and the barrel sinking end position increases in order to make the camera thin, interference between the cam grooves can be avoided to such an extent along the shortened length of the barrel sinking groove portions and the lens groups are therefore ensured to extend or retract well. It is necessary to reduce the outer diameter of the lens barrel in order to make small the size of a camera, particularly its height and width. Since interference between the cam grooves does not occur in the present invention, the outer diameter of the lens barrel can be reduced by the amount of the shortened length of the barrel sinking groove portions. The small outer diameter lowers the load on the zoom cam ring. This makes the driving motor small so that a compact and light camera can be obtained.

The second object of the present invention is to further improve the above-mentioned invention by providing a zoom lens barrel in which an engaging pin can smoothly move between a linear movement groove and a parallel groove even with a small driving power.

In order to achieve the above object, the zoom lens barrel of the present invention comprises: a linear movement guide tube which has a linear movement groove extending in a direction substantially parallel with the optical axis, a parallel groove extending in the circumferential direction substantially perpendicular to said optical axis and having an end connecting to the end of said linear movement groove; a zoom cam ring which is rotatably mounted on the outer peripheral portion of said linear movement guide tube and which has a cam groove formed to have a predetermined driving angle and to have a film side end overlapping one end of said parallel groove in a barrel sinking state; and a photographing optical system which is provided in said linear movement guide tube, is connected to an engaging portion engaged with said linear movement groove, said parallel groove and said cam groove, and is moved in the direction of said optical axis by a rotation of said zoom cam ring; and at least an inner periphery portion of the periphery of the contacting portion between said linear movement groove and said parallel groove is formed so as to locate at an inner position than the intersecting position in the case where said linear movement groove and said parallel groove are substantially perpendicular to each other.

The groove width of the connecting portion between said linear movement groove and said parallel groove is preferably formed to be larger than the width of said linear movement groove or the width of said parallel groove.

Out of the periphery of the connection portion between said linear movement groove and said parallel groove, at least an inner periphery portion is preferably formed substantially in the shape of an arc.

With the above-mentioned zoom lens barrel according to the present invention, when the engaging portion moves through the connection portion between the linear movement groove and the parallel groove, the resistance applied to the engaging portion becomes smaller, compared with a case in which the both grooves are intersecting each other. Accordingly, the engaging portion can be moved smoothly between the linear movement groove and the parallel groove, and the zoom cam ring can be rotated by a small driving power.

Still another object of the present invention is to rotate a rotating barrel smoothly in a lens barrel which urges the rotating barrel by using a urging member.

In order to achieve the above object, a lens barrel according to the present invention comprises: a rotating barrel which rotates about the optical axis for supporting the photographing optical system; an urging member for urging said rotating barrel to a predetermined direction; a receiving member for receiving said urging member, and an intermediate member which is arranged between said urging member and said rotating barrel and/or said urging member and said receiving member, to be urged by said urging member against said rotating barrel and/or said receiving member and is freely slidable with respect to said urging member and/or said receiving member.

Said intermediate member comprises a light shielding member for shielding a part of an incident light entering from said photographing optical system. Said urging member is a compression coil spring.

Said photographing optical system is a focus lens group or at least one group out of zoom lens groups consisting of a plurality of groups.

According to the present invention, the intermediate member is provided on at least one of the rotating barrel which is in contact with the urging member or the receiving member. If points, etc., exist at the end portion of the urging member and the rotating barrel is rotated in a state in which the urging member is inserted into a member with which it is in contact, the intermediate member, the rotating barrel and/or the receiving member are relatively rotated. Therefore, it is possible to rotate the rotating barrel smoothly.

DESCRIPTION OF THE PREFERRED EMBODIMENTS

The present invention will now be described by way of preferred embodiments with reference to the accompanying drawings.

Figure 1:
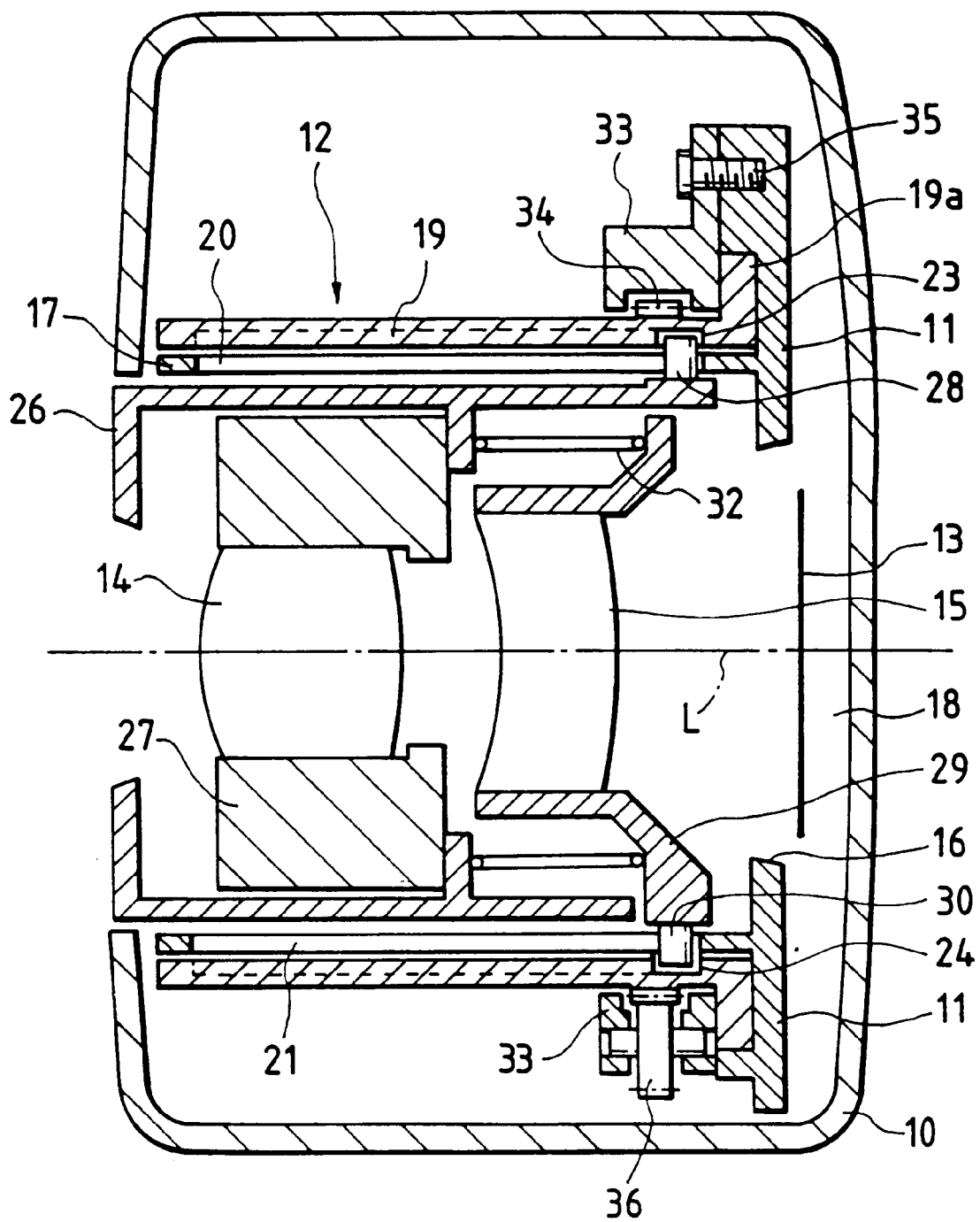
FIG. 1 is a general longitudinal cross-sectional view of one embodiment of a zoom lens barrel according to the present invention in a sinking state.

FIG. 1 is a general longitudinal cross-sectional view of one embodiment of a zoom lens barrel according to the present invention in a barrel sinking state.

Figure 2:
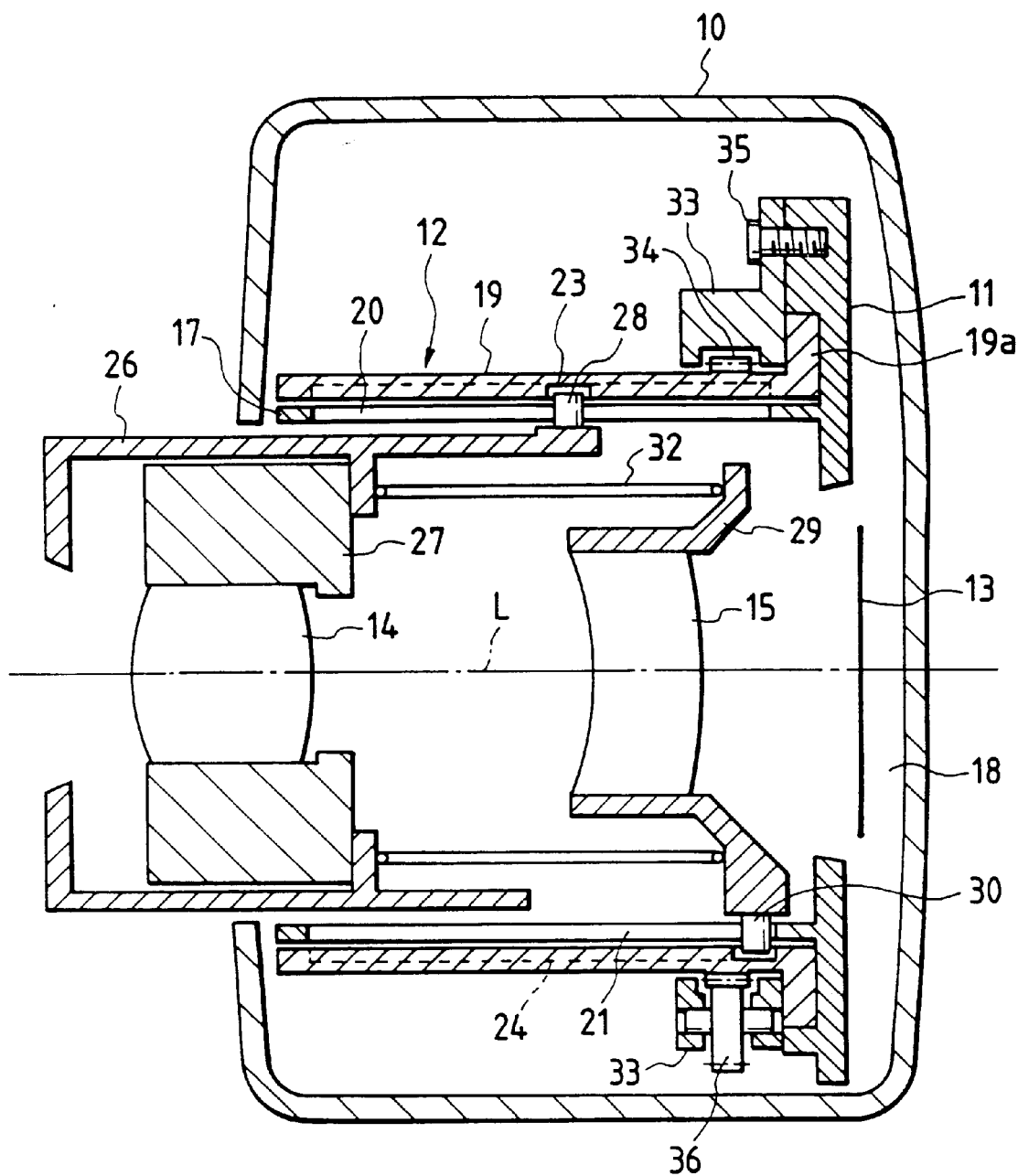
FIG. 2 is a general longitudinal cross-sectional view of the embodiment of FIG. 1 in a wide angle state.

FIG. 2 is a general longitudinal cross-sectional view of the zoom lens barrel in a wide angle state.

Figure 3:
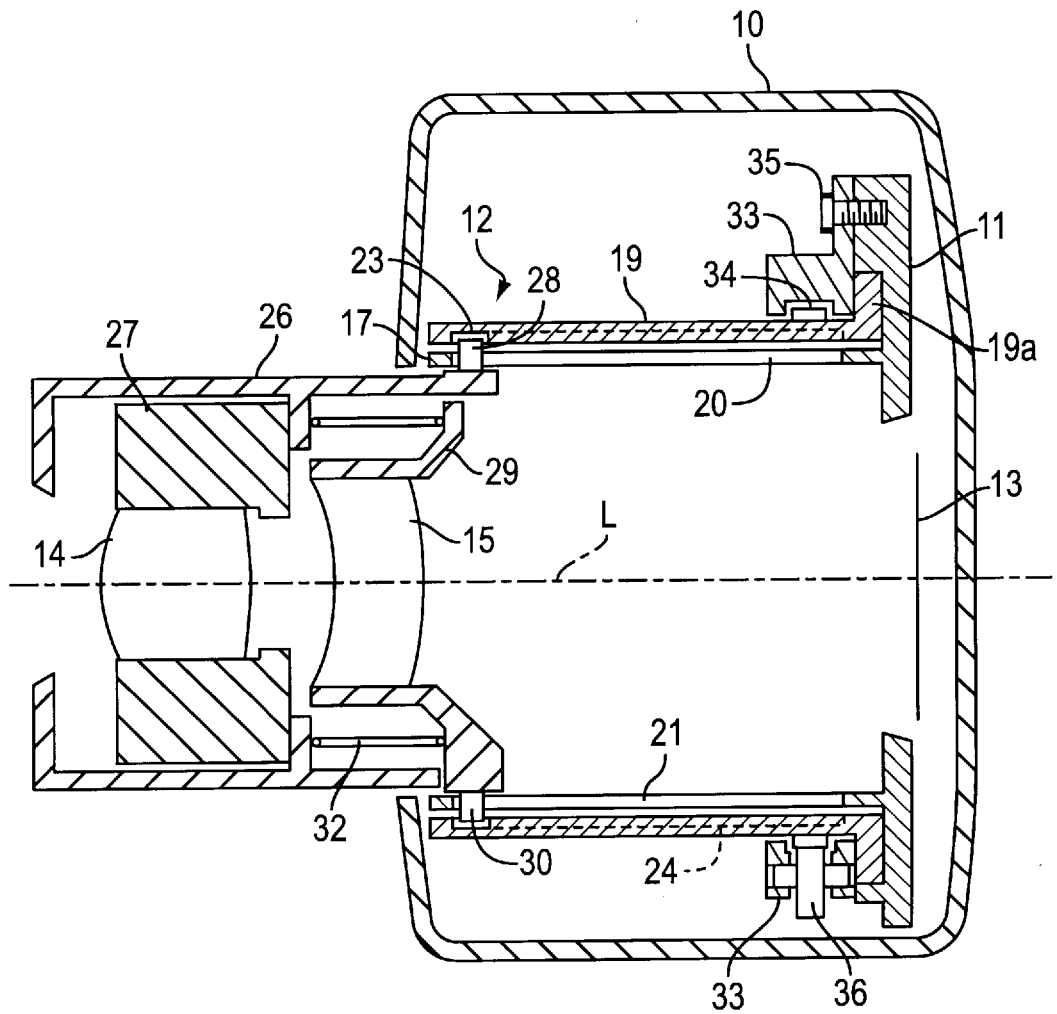
FIG. 3 is a general view of the embodiment of FIG. 1 in a telephotographic state.

FIG. 3 is a general longitudinal cross-sectional view of the zoom lens barrel in a telephotographic state.

Figure 4:
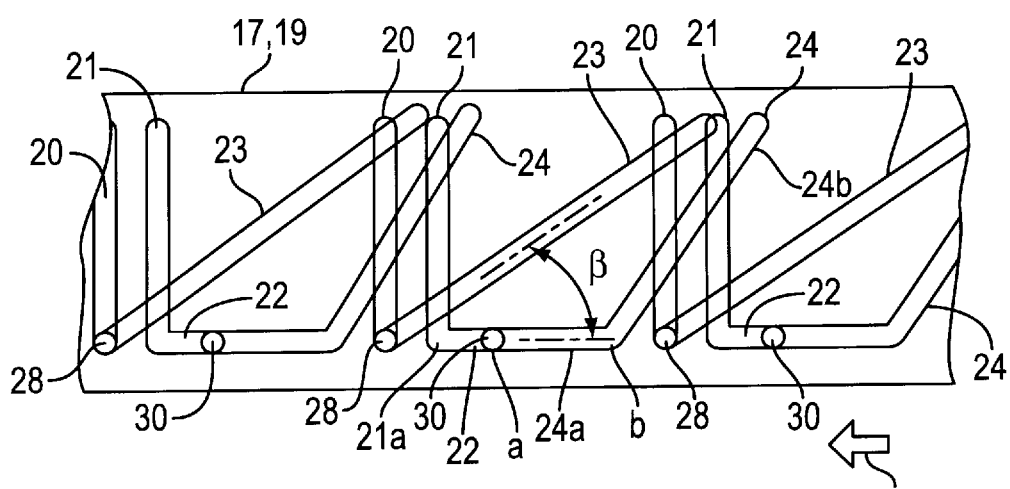
FIG. 4 is a developed view of the linear movement guide tube and the zoom cam ring of the zoom lens barrel of FIG. 1, showing the shapes of the guide grooves and the cam grooves and the relationship therebetween.
Figure 5:
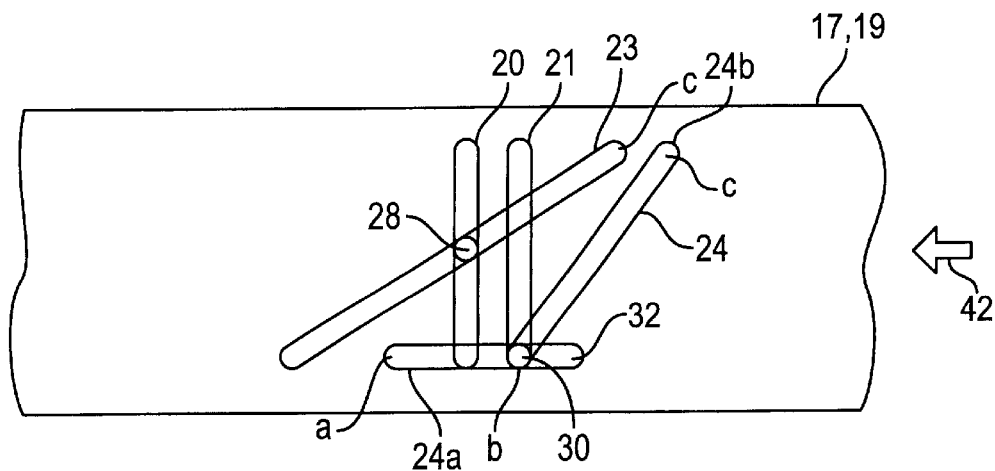
FIG. 5 is a developed view of the linear movement guide tube and the zoom cam ring of FIG. 4 in a wide angle state.

FIGS. 4 and 5 are developed views showing the shapes of the guide grooves and the cam grooves of the zoom lens barrel and the relationship therebetween. FIG. 4 shows their barrel sinking states and FIG. 5 illustrates their wide angle states.

In FIGS. 1 to 3, a camera body designated by 10 contains a main camera frame 11, a zoom lens barrel 12, photographing film 13 and first and second lens groups 14 and 15 constituting a zoom lens of a photographing optical system.

An aperture 16 is formed at the substantially central portion of the main camera frame 11, and a cylindrical linear movement guide tube 17 communicating with the aperture 16 is integrally formed on the main camera frame 11 and projects forward from its rear end. Behind the aperture 16 is provided a film passage 18 through which the film 13 travels.

The zoom lens barrel 12 comprises the linear movement guide tube 17 projecting from the main camera frame 11, the first and second lens groups 14 and 15 reciprocatingly provided in the linear movement guide tube 17, a zoom cam ring 19 rotatably mounted on the outer peripheral surface of the linear movement guide tube 17, and a driving motor (not shown) for rotating the zoom cam ring 19.

In the peripheral surface of the linear movement guide tube 17 are circumferentially equidistantly arranged a plurality sets of guide grooves (three first guide grooves 20 and three second guide grooves 21 in this embodiment). Each first guide groove 20 comprises a linear groove disposed in parallel with the optical axis L and restricts rotation of the first lens group 14 and defines its moving stroke. Each second guide groove 21 similarly comprises a linear groove parallel with the optical axis L and is formed close to the corresponding first guide groove 20.

Figure 15:
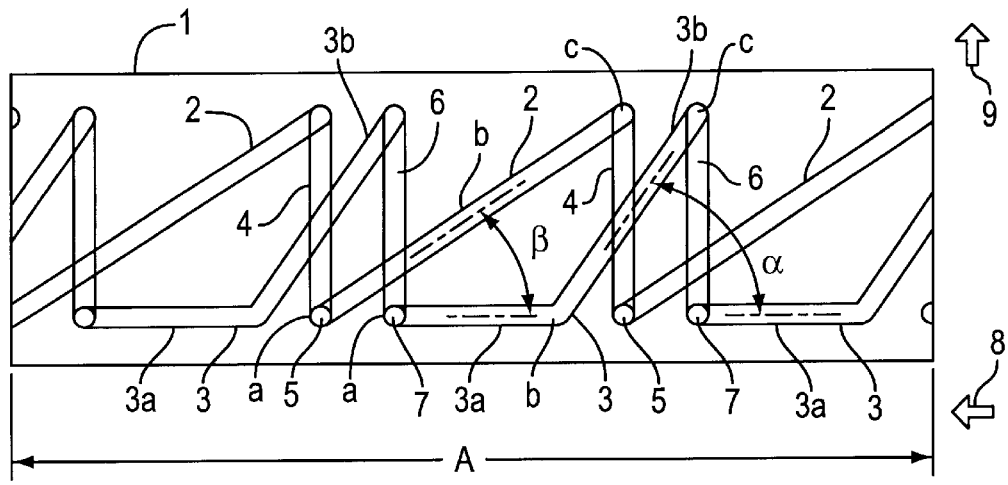
FIG. 15 is a developed view of the shapes of the guide grooves and the cam grooves of a conventional zoom lens barrel and the relationship therebetween.
Figure 16:
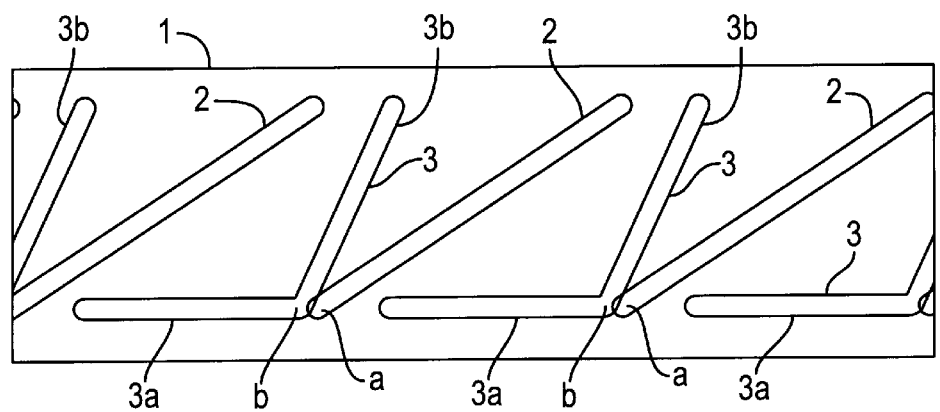
FIG. 16 is a view illustrating interference between the cam grooves of the conventional zoom lens barrel.
Figure 17:
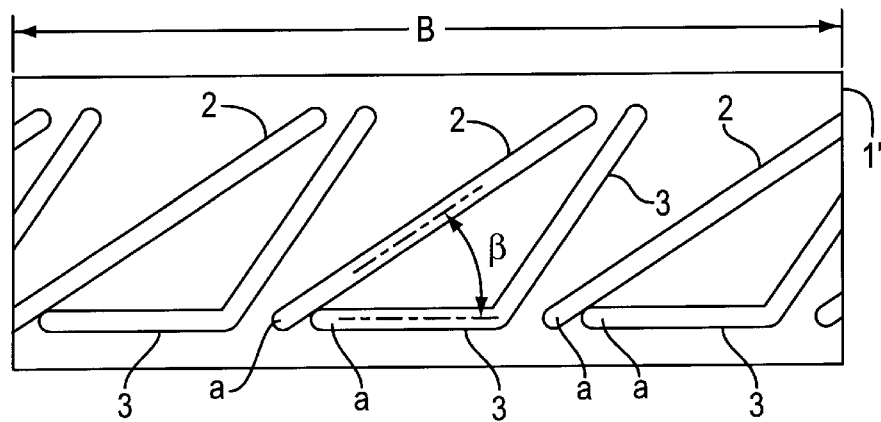
FIG. 17 is a view illustrating another type of interference between the cam grooves of the conventional zoom lens barrel.

As shown in FIG. 4, a parallel groove 22 perpendicular to the axis of the linear movement guide tube 17 and parallel with the photographing film 13 extends from the film side end 21a of each second guide groove 21 in the direction opposite to the direction toward the adjacent first guide groove 20. This arrangement is different from the arrangement of the each conventional guide groove 6 as shown in FIG. 15. Referring to FIG. 4, each parallel groove 22 has such a length that its forward end overlaps the barrel sinking side end a of the barrel sinking side of each of the later-described second cam groove 24 formed in the zoom cam ring 19.

As shown in FIG. 1, the first lens group 14 is provided in a first lens holder 26 through a shutter 27. The first lens holder 26 is slidably inserted in the linear movement guide tube 17. Three engaging pins 28 project from the outer peripheral surface of the rear end portion of first lens holder 26 and engage the first guide grooves 20 formed in the linear movement guide tube 17 so that the first lens holder 26 is slidably inserted in the linear movement guide tube 17 and is moved along the optical axis L but the rotation thereof is restricted (FIG. 4).

The second lens group 15 is held by a second lens holder 29 and is disposed at the rear side of the first lens group 14. The second lens holder 29 is placed at the rear side of the first lens holder 26 and is slidably inserted in the linear movement guide tube 17. Three engaging pins 30 project from the rear end portion of the second lens holder 29 are inserted in the second guide grooves 21 formed in the linear movement guide tube 17 so that the second holder 29 is moved along the optical axis L but the rotation thereof is restricted. Between the first lens holder 26 and the second lens holder 29 is provided a compression coil spring 32 which urges the second lens group 15 rearward to prevent it from shaking.

The zoom cam ring 19 is rotatably mounted on the outer peripheral surface of the linear movement guide tube 17 and is provided on the film side end of the outer peripheral surface thereof with a flange portion 19a slidably and rotatably held by the forward end of the main camera frame 11 and a ring-shaped holding member 33.

A gear 34 is formed on a portion of the outer peripheral surface of the zoom cam ring 19 which portion is close to the flange portion 19a. Three first cam grooves 23 and three second cam grooves 24 are alternately and equidistantly formed in the inner peripheral surface of the zoom cam ring 19.

The first cam grooves 23 form inclined zooming grooves with respect to the optical axis L, for receiving the tip ends of the engaging pins 28 and are used to reciprocate the first lens group 14 along the first guide grooves 20 of the linear movement guide tube 17. The second cam grooves 24 are used for reciprocating the second lens group 15 along the second guide grooves 21 of the linear movement guide tube 17, and each are formed into a shallow V-shaped groove which comprise a first barrel sinking groove portion 24a extending circumferentially of the zoom cam ring 19 in parallel with the film surface and a second zooming groove 24b inclined with respect to optical axis L at a predetermined angle. The tip end of the engaging pin 30 passing through the corresponding second guide groove 21 is inserted in the corresponding second cam groove 24. The first and second cam grooves 23 and 24 are the same as the conventional first and second cam grooves 2 and 3 as shown in FIG. 15, except that the barrel sinking grooves 24a of the second cam groove 24 of the present invention is shorter by the length of the parallel groove 22 than that of the conventional second cam groove 3.

As shown in FIG. 1, the holding member 33 is fixed to the front surface of the main camera frame 11 by means of a bolt 35 and rotatably supports a gear 36 engaging with the gear 34 of the zoom cam ring 19. During the zooming operation, the gear 36 is rotated by means of a driving motor (not shown) to selectively extend and retract the zoom cam ring 19.

The camera of a sinking barrel type having the zoom lens barrel 12 as described above is constructed so that the first lens holder 26 is fully pulled in the linear movement guide tube 17 in the camera body 1 when in a barrel sunk state, as shown in FIG. 1. In the barrel sinking state as shown in FIG. 4, each engaging pin 28 is positioned at the film side end of the first guide groove 20, and each engaging pin 30 of the second lens holder 29 is located at the forward end of the parallel groove 22 of the respective guide groove 21 and the film side end a of the respective second cam groove 24.

As the zoom cam ring 19 is rotated in the direction as shown by an arrow 42 in FIG. 4 in which the zoom cam ring 19 is extended, the first cam groove 23 is moved to the left side from the state of FIG. 4 to the state of FIG. 5. Each engaging pin 28 is pushed by the lower surface of the corresponding first groove 23 upward in FIG. 4, and the axial component of the force pressing the engaging pin 28 moves the engaging pin 28 toward the object along the corresponding first guide groove 20. Thus, the first lens group 14 advances together with the first lens holder 26 and projects outward of the camera body 10 from the linear movement guide tube 17.

As the zoom cam ring 19 is rotated in such a direction in which the zoom cam ring 19 is extended, the second cam grooves 24 are moved leftward. Thus, each engaging pin 30 is moved to the wide angle end position b in a state in which the parallel groove 22 overlaps the corresponding barrel sinking groove portion 24a of the corresponding second cam groove 24. Since each parallel groove 22 and the barrel sinking groove portion 24a are formed parallel with the film surface, the engaging pins 30 cannot advance along the second guide grooves 21 but the second lens group 15 is retained at the barrel sinking position. Rotation of the zoom cam ring 19 by the amount of the angle corresponding to the length of the first barrel sinking groove portion 24a allows the engaging pins 30 to move to the wide angle ends b of the barrel sinking groove portions 24a, whereby the first and second lens groups 14 and 15 are set to the wide angle state, as shown in FIG. 2.

As the zoom cam ring 19 is rotated in the extended direction of the zoom cam ring 19 from the wide angle state, the engaging pins 28 and 30 are moved toward the object along the first and second guide grooves 20 and 21 and stop at the telephotographing position c so that the first and second lens groups 14 and 15 take the telephotographing states, as shown in FIG. 3.

When the driving motor is driven in the opposite direction to the one as mentioned above so as to rotate the zoom cam ring 19 in the retracting direction, the engaging pins 28 and 30 are moved toward the film along the guide grooves 20 and 21 of the first and second guide grooves 20 and 21. The first and second lens groups 14 and 15 are retracted into the linear movement guide tube 17 so as to be returned to the barrel sinking state.

In the present embodiment, each parallel groove 22 which is perpendicular to the optical axis L extends from the film side end of the corresponding second guide groove 24. Since each parallel groove 22 has the same function as the barrel sinking groove portion 24a, the length of each barrel sinking groove portion 24a can be shortened by the amount of the length of each parallel groove 22. In case of the lens system having a large amount of the barrel sinking from the wide angle side position b or in case where the stroke from the wide angle position b to the barrel sinking position increases so as to make the camera body thin and compact, interference between the cam grooves 23 and 24 are securely prevented even if the stroke and the rotational angles of the first cam grooves 23 are equal to those of the second cam grooves 24. Thus, the first and second lens groups 14 and 15 securely extend and retract. Since each parallel groove 22 functions as a barrel sinking groove portion, the distance between the first and second lens groups 14 and 15 at the barrel sinking time does not become large.

The separation of the barrel sinking groove portion 24a of each second cam groove 24 from the corresponding first cam groove 23 is larger by the length of the parallel groove 22 than the separation between the first cam groove 2 and the barrel sinking groove portion 3a of the second cam groove 3 of FIG. 15. Each if, therefore, the diameter of the lens barrel is reduced to make the camera compact, it is unnecessary to enlarge the angle of inclination β between the first cam groove 23 and the film surface, thus preventing interference between the first and second cam grooves 23 and 24. When the angle of inclination β is small, the rotational load for rotating the zoom cam ring 19 is also small. Thus, a small driving motor can be used.

During the movement from the barrel sinking position a to the wide angle position b, the engaging pins 30 would shake in the circumferential directions of the zoom cam ring 19 in the parallel groove 22 and the lens holders 26 and 29 would rotate. However, the second lens 15 does not change its position and shape upon receiving the external forces, because the second lens group 15 is disposed in the linear movement guide tube 17. Further, the shaking of the engaging pins 30 can be eliminated by being urged in a direction by means of a spring.

Figure 6:
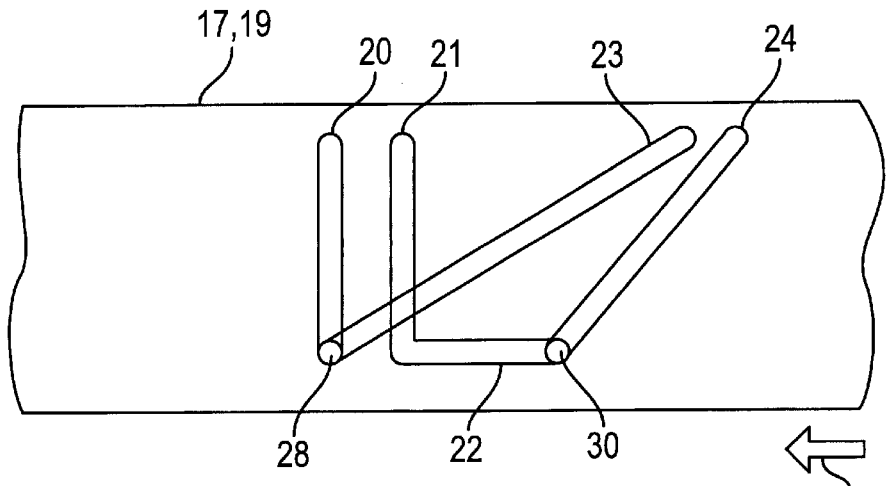
FIG. 6 is a developed view of the linear movement guide tube and the zoom cam ring of another embodiment of a zoom lens barrel according to the present invention, showing the shapes of the guide grooves and the cam grooves and the relationship therebetween.
Figure 7:
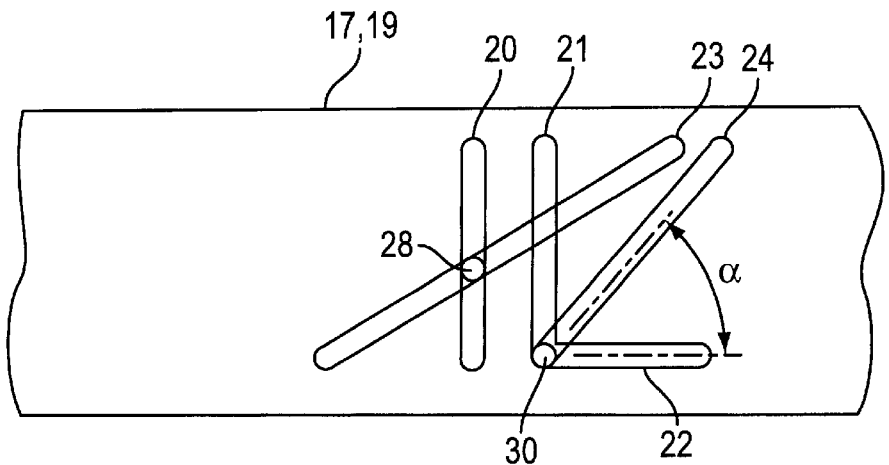
FIG. 7 is a developed view of the linear movement guide tube and the zoom cam ring of FIG. 5 in a wide angle state.

FIGS. 6 and 7 are developed views of the another embodiment of the present invention showing the relationship between the guide grooves and the cam grooves. FIG. 6 shows the barrel sinking state and FIG. 7 illustrates the wide angle state. In this embodiment, each second cam groove 24 is formed merely by a linear zooming groove inclined with respect to the optical axis and the barrel sinking groove portion 24a as shown in FIG. 4 is omitted. A parallel groove 22 extends from the film side end of each second guide groove 21 to the film side end of the corresponding second cam groove 24 so that the parallel groove 22 is used as a barrel sinking groove portion. The other structure of the second embodiment is the same as the first embodiment.

In the second embodiment, the second cam groove 24 is not provided with a barrel sinking groove portion. Thus, the angle of inclination α of the second cam groove 24 of the second embodiment can be made smaller than that of the first embodiment. The small angle of inclination α can reduce the load at the time of driving the zoom cam ring and miniaturize the motor. As the angle of inclination α becomes smaller, the length of the cam can be made larger and the cam accuracy increases. When the second cam groove 24 does not have a barrel sinking groove portion, the engaging pin 30 does not shake and the lens holders 26 and 29 are prevented from being rotated.

The present invention is described by way of the embodiments of the zoom lens barrel, each of which is provided with two lens groups 14 and 15, but is not limited thereto. Naturally, the present invention is applicable to a zoom lens barrel having three or more lens groups.

With the above-mentioned arrangement, even if a stroke from the wide angle position to the barrel sinking position is increased, interference between the cam grooves 23 and 24 can be prevented, the thickness of the camera can be reduced, and further, the outer diameter of the lens barrel can be made smaller.

However, since the direction of movement is abruptly changed by 90 degrees when the zoom cam ring 19 is rotated in the direction of the arrow 42 and the engaging pin 30 is moved from the parallel groove 22 to the guide groove 21 (FIG. 6), a sliding resistance applied on the engaging pin 30 becomes large in some cases depending on an amount of play with the parallel groove 22. For this reason, it is necessary to set a driving power of the driving motor for rotatingly driving the zoom cam ring 19 to be large to some extent. As a result, a small-sized driving motor can not be used, which hinders compactness of the apparatus.

The following embodiment was conceived to solve this problem, and will be described with reference to FIGS. 8, 9 and FIGS. 10A to 10C. Arrangements other than those described are the same as those in the foregoing embodiment.

Figure 8:
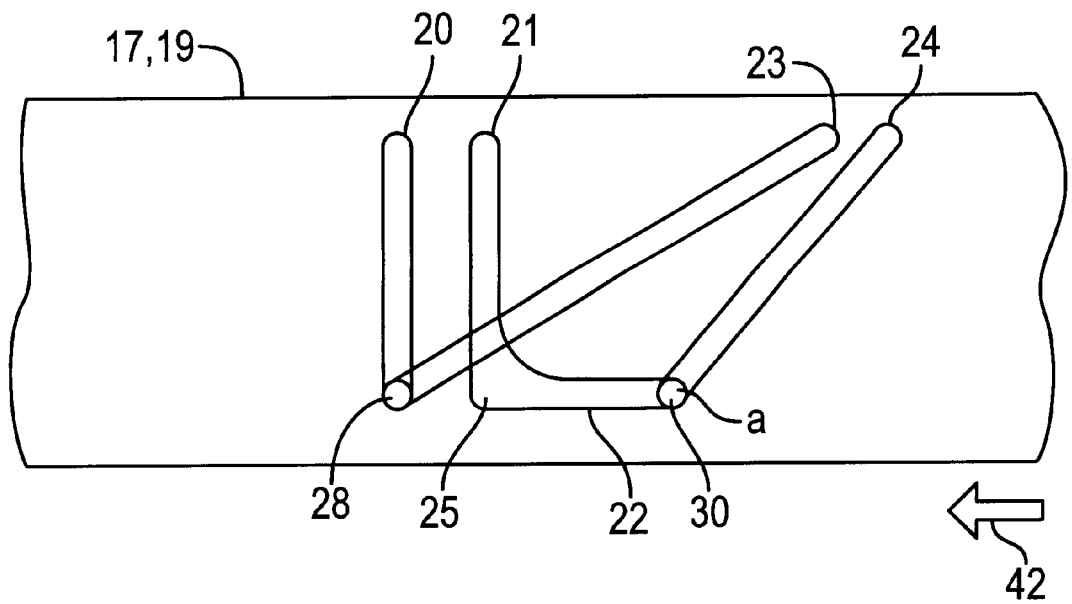
FIG. 8 is a view showing the shapes of the guide grooves and the cam grooves and the relationship therebetween in a barrel sinking state.
Figure 9:
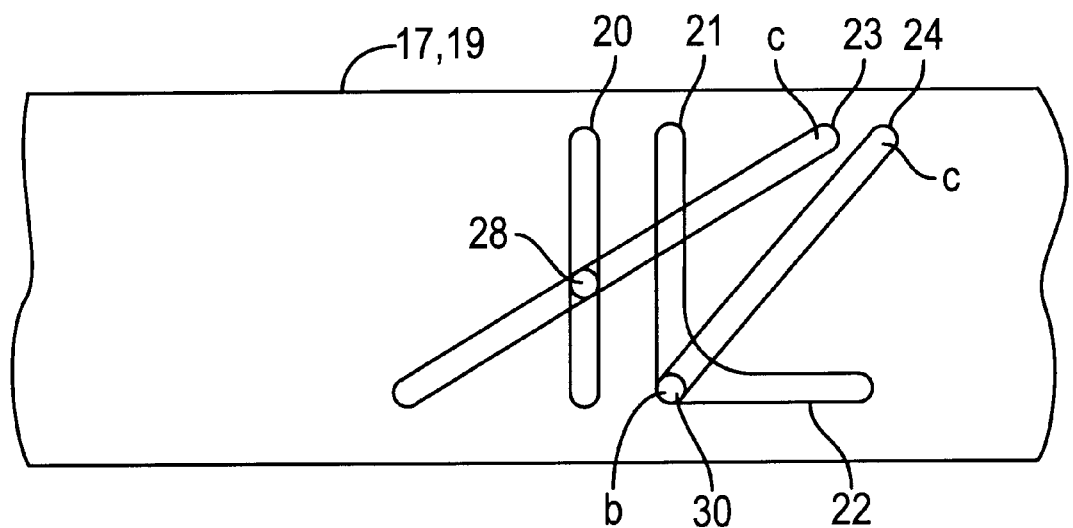
FIG. 9 is a view showing the wide angle state of FIG. 8.

FIGS. 8 and 9 are developed views of the linear movement guide tube 17 and the zoom cam ring 19 for showing the shapes of the guide cams and the cam grooves and relationship therebetween, in a barrel sinking state and a wide angle state, respectively.

Referring to FIG. 8, the first and second guide grooves 20 and 21 are equidistantly formed in the circumferential direction (to the right and left directions in the drawing, respectively) on the peripheral surface of the linear movement guide tube 17. Though not shown in FIG. 8, a plurality of the first and second guide grooves 20 and 21 (three, for example) are formed in the circumferential direction, respectively.

The inner periphery of the connecting portion 25 between the side end of the first guide groove 20 of the parallel groove 22 and the film side end of the second guide groove 21 is formed substantially in the shape of an arc so as to locate at an inner position than the intersecting position in the case where the first guide groove 21 and the inner periphery of the parallel groove 22 are substantially perpendicular to each other. Accordingly, the groove width of the connecting portion 25 is formed to be larger than that of the first guide groove 21 or the parallel groove 22. The present embodiment is different from the foregoing embodiment only in the arrangement of this connection portion.

In the present embodiment, since the inner periphery of the connecting portion 25 between the second guide groove 21 and the parallel groove 22 is formed substantially in the shape of an arc and the groove width of the connecting portion 25 is enlarged, the sliding resistance of the engaging pin 30 decreases when the engaging pin 30 passes through the connecting portion 25. Therefore, the load on the zoom cam ring 19 when it is driven is reduced so that the zoom cam ring can be rotated more smoothly.

On the other hand, since only the inner periphery of the connecting portion 25 is formed substantially in the shape of arc, a play between the engaging pin 30 and the connecting portion 25 becomes larger in the vicinity of the wide angle ends. However, after the zoom lens barrel 12 is moved by a zooming operation, the zoom lens barrel is stopped without fail in the direction that the zoom cam ring 19 takes up the first lens holder 26 in order to eliminate shaking of the zoom cam ring 19 for the sake of the control thereof. Therefore, the engaging pin 30 is urged against the outer periphery (outer side) of the connecting portion 25 so as to prevent unevenness in the position of the second lens group 15 caused by said shaking.

Figure 10A:
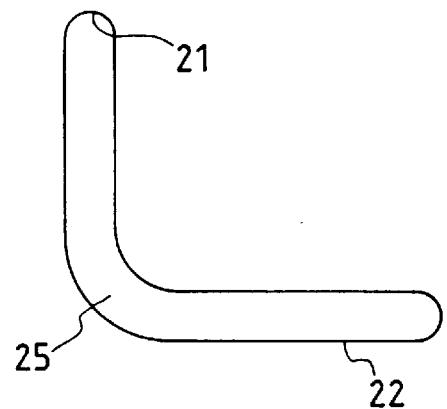
FIGS. 10A to 10C are views showing another embodiment, showing the shapes of the connecting portion 25.
Figure 10B:
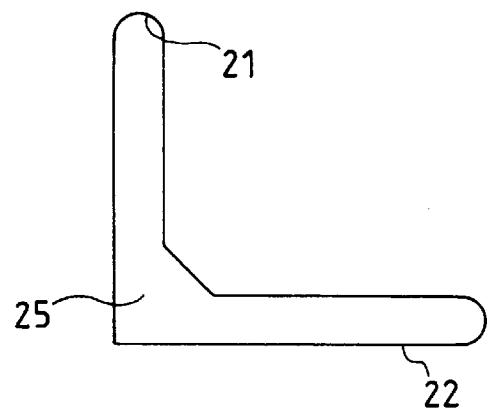
Figure 10C:
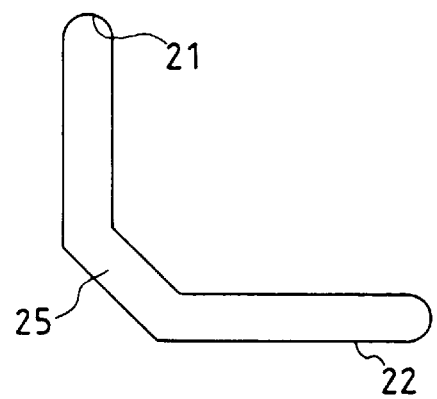

FIGS. 10A to 10C are views for showing modified shapes of the connecting portion 25. FIG. 10A shows the outer periphery of the connecting portion 25 which is substantially formed in the shape of the arc in the same manner as the inner periphery. Therefore, in this example, the groove widths of the second guide groove 21, the connecting portion 25 and the parallel groove 22 are substantially the same. FIG. 10B shows the inner periphery of the connecting portion 25 which is substantially formed linearly with an inclination with respect to the second guide groove 21 and the parallel groove 22. FIG. 10C shows the connecting portion 25 of the FIG. 10B with the inclined outer periphery formed substantially linearly.

Even when the connecting portion 25 is thus formed, the engaging pin 30 can be smoothly moved between the second guide groove 21 and the parallel groove 22.

The present embodiment is so formed that the resistance applied to the engaging portion may be smaller when the engaging portion travels through the connecting portion between the linear movement groove and the parallel groove, the engaging portion can be moved smoothly and the zoom cam ring can be rotated with a small driving power. In this manner, the size of the driving motor can be reduced and the camera can be made compact and lightweight.

Next, another embodiment of the present invention in which the rotating barrel can be rotated more smoothly will be described below.

Figure 11:
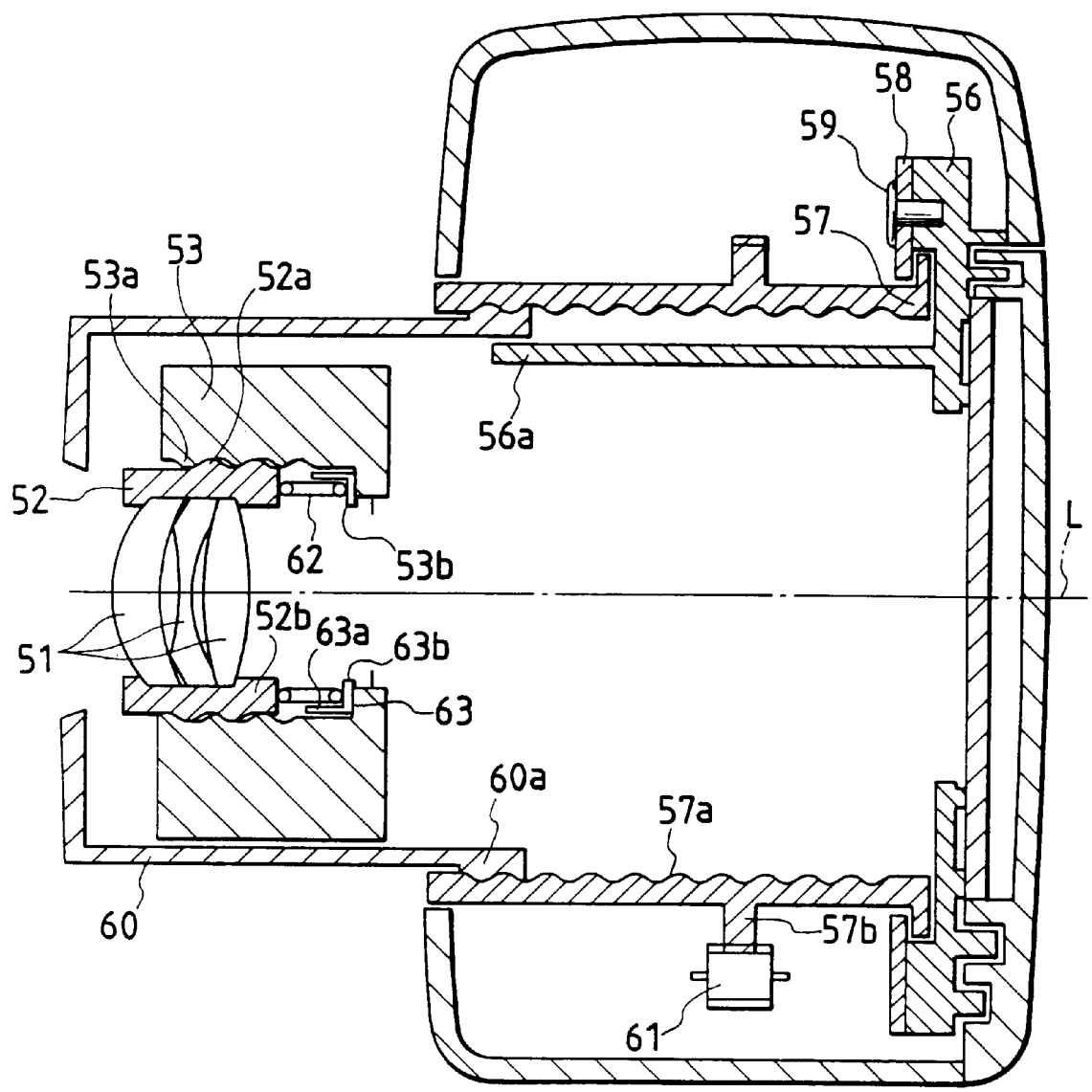
FIG. 11 is a cross-sectional view showing the arrangement of the first embodiment of the camera to which the lens barrel of the present invention is applied.

Referring to FIG. 11, the outer barrel 57 is supported rotatably about the optical axis L by a camera main frame 56, and a pressing plate 58 which is fixed to the camera main frame 56 by a set screw 59. A female helicoid 57a is provided on the inner periphery of the outer barrel 57, while a driving gear 57b is provided on the outer periphery thereof. The driving gear 57b is engaged with a gear 61 which is provided outside the outer barrel 57.

A male helicoid 60a is provided on the outer peripheral portion of the inner barrel 60, and is helicoid-connected to the female helicoid of the outer barrel 57. A rotation of the inner barrel 60 is restricted by a key 56a which extends from the camera main frame 56.

A shutter portion 53 is fixed inside the inner barrel 60. A female helicoid 53a is provided on the inner periphery portion of the shutter portion 53.

Also, a male helicoid 52a is provided on the outer periphery portion of a lens holding frame 52 for holding a photographing lens 51 and is helicoid-connected to the female helicoid 53a of the shutter portion 53.

A compression coil spring 62 is provided between a rear end portion 52b of the lens holding frame 52 and a receiving portion 53b of the shutter portion 53. The compression coil spring 62 is urged in such manner that the rear end portion 52b of the lens holding frame 52 is estranged from the receiving portion 53b of the shutter portion 53. As a result, the lens holding frame 52 is urged in the direction of the optical axis (to the left in the drawing) so as to remove a play generated between the female helicoid 53a and the male helicoid 52a.

Further, a washer 63 is intervened between the compression coil spring 62 and the receiving portion 53b of the shutter portion 53. The washer 63 comprises a rise portion 63a and a flat portion 63b, and the compression coil spring 62 presses the flat portion 63b, whereby the washer 63 is substantially contacted with pressure to the receiving portion 53b by the urging force of the compression coil spring 62 and is smoothly slidable with respect to the receiving portion 53b.

When a gear 61 is rotated by a driving operation of the driving motor (not shown), the outer barrel 57 is rotated about the optical axis L, whereby a rotation of the inner barrel 60 is restricted so that the inner barrel is slidingly moved in the direction of the optical axis L.

Also, the shutter portion 53 rotates the lens holding frame 52 in response to a signal indicative of a distance of an object to be photographed which is transmitted from a distance measuring apparatus (not shown), and the photographic lens 51 is rotatingly moved in the direction of the optical axis L along the leads of the male and female helicoids 52a and 53a so as to perform a focusing operation.

Here, when the lens holding frame 52 is rotated and is moved to the direction of the optical axis L, the end portion of the compression coil spring 62 has points or other unevenness and is grabbed by or stuck into the rear end portion 52b of the lens holding frame 52 or the washer 63. When the both members can not move relatively and smoothly, a relative sliding is generated between the washer 63 and the receiving portion 53b of the shutter portion 53. Therefore, the lens holding frame 52 can rotate always smoothly about the optical axis L.

Figure 12:
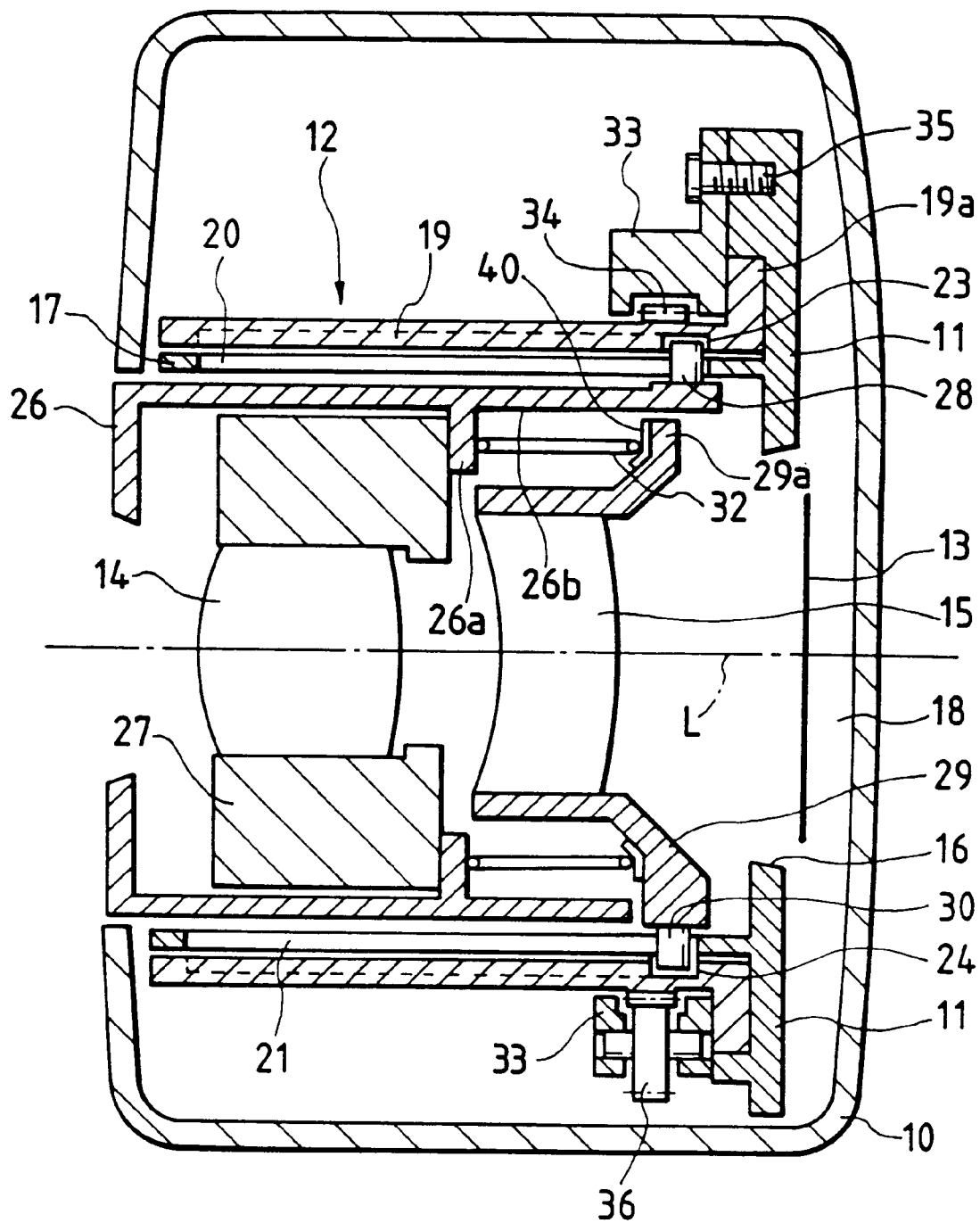
FIG. 12 is a cross-sectional view showing the arrangement of the camera in a barrel sinking state to which the second embodiment of the lens barrel of the present invention is applied.
Figure 13:
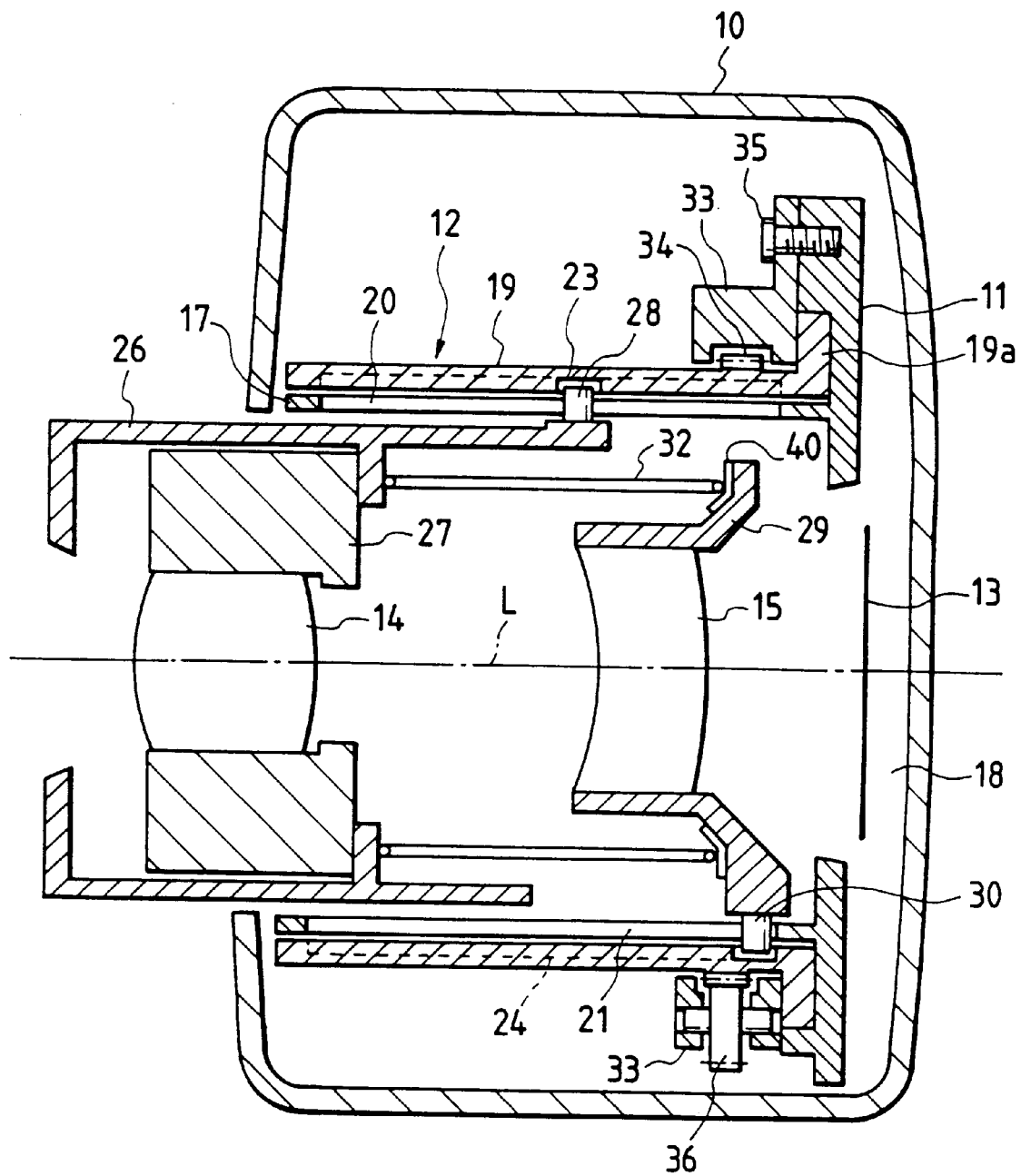
FIG. 13 is a view showing the camera in the cross-sectional view of FIG. 12 in a wide angle state.
Figure 14:
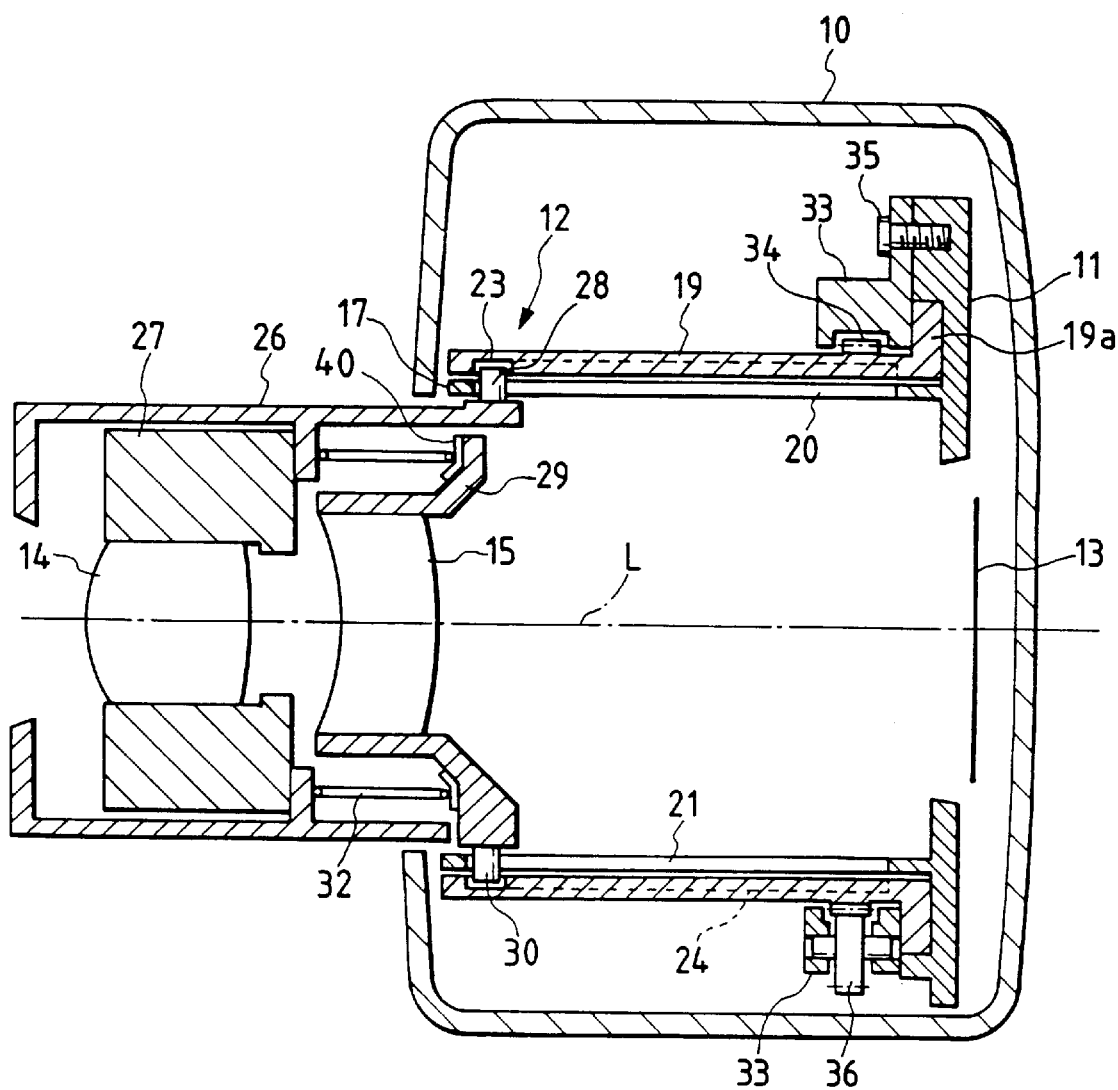
FIG. 14 is a view showing the camera in the cross-sectional view of FIG. 12 in a telephotographic state.

FIGS. 12 to 14 are cross sectional views showing arrangements of a camera to which another embodiment of the present invention in which the rotating barrel can be rotated smoothly is applied, in a wide angle state and in a telephotographic state, respectively.

The embodiment shown in FIGS. 12 to 14 is different from the embodiment shown in FIGS. 1 to 3 only in that it comprises a receiving member which receives an urging member for urging the rotating barrel, and an intermediate member which is provided between the urging member and the receiving member, urged by the urging member against the receiving member and slidable with respect to the receiving member. Other arrangements are the same as those of the embodiment of FIGS. 1 to 3. The above-mentioned difference will be described below.

Between the first lens holder 26 and the second lens holder 29, a compression coil spring 32 is provided through a washer 40. The spring 32 urges the second lens group 15 rearward to prevent shaking of the second lens group 15. The washer 40 is smoothly slidable with respect to the second lens holder 29, and is closely contacted to the second lens holder 29 by an urging force of the compression coil spring 32.

If the washer 40 is not present, the end of the seat of the compression coil spring 32 may be in some cases grabbed by or stuck into the seat 26a of the first lens holder 26 or the flange 29a by a rotation of the second lens holder 29. A smooth rotation of the second lens holder 29 can not be obtained because of this. Then, when the washer 40 intervenes between the second lens holder 29 and the compression coil spring 32, even if any bitting or sticking is caused between the position 26a of the first lens holder 26 and the end of the compression coil spring 32, or between the washer 40 and the end of the compression coil spring 32, a sliding is caused between the washer 40 and the second lens holder 29 and the second lens holder 29 can smoothly rotate about the optical axis L.

In the embodiment shown in FIG. 11, the washer 63 is provided between the compression coil spring 62 and the receiving portion 53b of the shutter portion 53. However, the position of the washer is not limited to this. The washer may be provided between the compression coil spring 62 and the rear end portion 52b of the lens holding frame 52. In this case, the washer may be provided in one of these positions, or may be provided in both of these positions. In the same way, in the embodiment shown in FIGS. 12 to 14, the washer 40 may be provided between the compression coil spring 32 and the position 26a of the first lens holder 26.

Also, the flat portion 63b of the washer 63 is extending in the direction of the optical axis in the embodiment shown in FIG. 11, or, the flat portion of the washer 40 is extending up to the inner peripheral portion 26b of the first lens holder 26 in the second embodiment, so that said flat positions can serve as a light shielding member.

With a lens barrel as shown in FIGS. 11 to 14, it is possible to rotate the rotating barrel smoothly by providing the intermediate member even if the urging member is grabbed by or stuck into an opposite member. In this way, the positional accuracy of the rotating barrel at the time of rotating driving operation can be further improved.

What is claimed is:

1. A zoom lens barrel comprising:
    at least two lens groups, a linear movement guide tube to guide a linear movement of said lens groups along an optical axis and a cam tube to reciprocate said lens groups along said optical axis, said guide tube having a guiding portion formed on a film side end portion of said guide tube and extending in parallel with a film surface.

2. A zoom lens barrel for varying a composite focal length by moving a plurality of lens groups forward and backward respectively to the direction of an optical axis so as to change a distance between said lens groups, the zoom lens barrel comprising:
    a plurality of lens holding members to respectively support said plurality of lens groups;
    a linear movement guide tube fixedly arranged to be respectively engaged with said plurality of lens holding members and to have a plurality of linear movement grooves extending in a substantially parallel direction to the optical axis; and
    a zoom cam ring which has a plurality of cam grooves respectively engaged with said plurality of lens holding members, inclined with each other to the direction of the optical axis, and having final end portions terminating at one end on the film side, and which is rotatably fitted in said linear movement guide tube to be movable to a zooming position and a barrel sinking position, and
    wherein said guide tube is provided with a parallel groove which extends substantially parallel with a film surface, is connected to the film end side terminating portion of at least one groove of said plurality of linear movement grooves, is perpendicular to the axis of said guide tube, and overlaps the film side terminating end portion of the corresponding cam groove when said cam ring is in a barrel sinking state.

3. A zoom lens barrel according to claim 2, wherein at least an inner peripheral portion of a periphery of a connecting portion between said linear movement groove and said parallel groove is formed at an inner side of an intersecting position at which said linear movement groove substantially intersects said parallel groove.

4. A zoom lens barrel according to claim 3, wherein at least one inner peripheral portion of the periphery of the connecting portion between said linear movement groove and said parallel groove is formed substantially in the shape of an arc.

5. A zoom lens barrel according to claim 2, wherein the groove width of a connecting portion between said linear movement groove and said parallel groove is formed to be larger than the width of said linear movement groove or the width of said parallel groove.

6. A zoom lens barrel according to claim 2, wherein at least an inner peripheral portion of a periphery of a connecting portion between said linear movement groove and said parallel groove is formed substantially in the shape of an arc.

7. A lens barrel according to claim 2, further comprising:
    an urging member to urge said lens holding members to a predetermined direction;
    a receiving member to receive said urging member; and
    an intermediate member which is provided between said urging member and said cam ring and/or between said urging member and said receiving member, is urged by said urging member against said cam ring and/or said receiving member, and is freely slidable with respect to said cam ring and/or said receiving member.

8. A lens barrel according to claim 7, wherein said intermediate member is provided with a light shielding portion to shield a part of an incident light entering through said lens groups.

9. A lens barrel according to claim 7, wherein said urging member is a compression coil spring.

10. A lens barrel comprising:
    a rotating barrel rotatable about an optical axis to support a photographing optical system;
    an urging member to urge said rotating barrel to a predetermined direction;
    a receiving member to receive said urging member; and
    an intermediate member which is provided between said urging member and said rotating barrel and/or between said urging member and said receiving member, is urged by said urging member against said rotating barrel and/or said receiving member, and is freely slidable with respect to said rotating barrel and/or said receiving member.

11. A lens barrel according to claim 10, wherein said intermediate member is provided with a light shielding portion to shield a part of an incident light entering from said photographing optical system.

12. A lens barrel according to claim 10, wherein said urging member is a compression coil spring.

13. A lens barrel according to claim 10, wherein said photographing optical system is a focal lens group or at least one lens group selected out of a plurality of zoom lens groups.

* * * * *